United States Patent
Evans et al.

(10) Patent No.: US 7,900,882 B2
(45) Date of Patent: Mar. 8, 2011

(54) DUAL HOOK CLAMP

(75) Inventors: Nigel Evans, Sutton Coldfield (GB); William E. Hewlett, Burton on Trent (GB)

(73) Assignee: Production Resource Group, LLC, New Windsor, NY (US)

( * ) Notice: Subject to any disclaimer, the term of this patent is extended or adjusted under 35 U.S.C. 154(b) by 0 days.

(21) Appl. No.: 10/680,932

(22) Filed: Oct. 7, 2003

(65) Prior Publication Data

US 2004/0065796 A1   Apr. 8, 2004

Related U.S. Application Data

(63) Continuation of application No. 09/779,194, filed on Feb. 7, 2001, now Pat. No. 6,682,031.

(60) Provisional application No. 60/181,455, filed on Feb. 10, 2000.

(51) Int. Cl.
*A47B 96/06* (2006.01)
*B60Q 1/124* (2006.01)

(52) U.S. Cl. ......... 248/214; 248/340; 248/543; 362/233; 362/239

(58) Field of Classification Search .......... 362/236, 362/396, 250, 233, 414, 238, 239, 217.14, 362/217.15, 217.16, 217.17, 249.11, 382–384, 362/427–428; 248/214, 543, 323, 324, 339, 248/340; 52/648.1, 28, 29
See application file for complete search history.

(56) References Cited

U.S. PATENT DOCUMENTS

| | | | |
|---|---|---|---|
| 577,429 A | 2/1897 | Homan | |
| 2,036,567 A | 4/1936 | Cannon | |
| 3,706,437 A | 12/1972 | Eberhardt | |
| 3,783,263 A | 1/1974 | Cruse | |
| 3,869,604 A | 3/1975 | Prochnow | |
| 3,936,023 A | 2/1976 | Clifton | |
| 4,142,703 A | 3/1979 | Moretto | |
| 4,167,783 A * | 9/1979 | Mitchell | 362/236 |
| 4,190,881 A * | 2/1980 | Drost et al. | 362/250 |
| 4,258,413 A | 3/1981 | Mausser | |
| 4,392,187 A * | 7/1983 | Bornhorst | 362/233 |
| 4,410,933 A | 10/1983 | Blake et al. | |
| 4,434,454 A * | 2/1984 | Day | 362/238 |
| 4,598,345 A | 7/1986 | Kleeman | |
| 4,837,665 A | 6/1989 | Hoyer et al. | |
| 5,203,626 A | 4/1993 | Clement | |
| 5,432,691 A * | 7/1995 | Garrett et al. | 362/233 |
| 5,672,003 A * | 9/1997 | Shemitz et al. | 362/396 |
| 5,702,082 A | 12/1997 | Evans et al. | |
| 5,743,060 A * | 4/1998 | Hayes et al. | 52/648.1 |
| 5,772,315 A | 6/1998 | Shen | |
| 5,931,257 A | 8/1999 | Harden | |
| 5,984,248 A | 11/1999 | Evans et al. | |
| 6,004,005 A | 12/1999 | Demshki, Jr. | |
| 6,227,688 B1 | 5/2001 | Taylor et al. | |
| 6,390,655 B1 | 5/2002 | Haugaard et al. | |
| 6,682,031 B2 * | 1/2004 | Evans et al. | 248/214 |
| 7,172,332 B2 * | 2/2007 | Mobarak et al. | 362/649 |

* cited by examiner

Primary Examiner — Tan Le
(74) Attorney, Agent, or Firm — Law Office of Scott C. Harris, Inc.

(57) ABSTRACT

A hook clamp has surfaces allowing the clamp to be placed on a support and clamped thereto. The surfaces are such that the clamp can be placed on the support and its weight held by the support prior to tightening. The clamp has a built-in connector for supplying power to the lamp. The clamp has one or more fail-safe holes for securing the clamp to the support with a safety cable. The clamp also has one or more flanges that can be received by a separate mounting bracket, for mounting the clamp and any attached element during storage, staging, or when otherwise not being used.

7 Claims, 11 Drawing Sheets

DUAL HOOK CLAMP

CROSS-REFERENCE TO RELATED APPLICATIONS

This application is a continuation application of and claims priority to U.S. application Ser. No. 09/779,194, filed on Feb. 7, 2001 now U.S. Pat. No. 6,682,031, which claims the benefit of U.S. Provisional Application Serial No. 60/181,455 filed Feb. 10, 2000.

FIELD OF THE INVENTION

The present invention relates to a clamp for holding a stage-mounted device relative to a stage support truss. More specifically, the present invention defines a hook clamp, which holds the weight and position of the stage-mounted device while it is being mounted to the support truss, and also has an electrical connector extending through the clamp.

BACKGROUND AND SUMMARY

Many stage-mounted devices require a stable base of support. Moving stage lights are often particularly sensitive to such requirements. Typically, moving lights are electronically controllable to move between various positions and to provide special effects. The position of a moving light, however, is accurate only when the system has a very stable base of support. Moreover, because of the lamp size, cooling requirements, and complicated electronics, these lamp devices can be very heavy. Many times such lights are mounted at the upper area of the stage, very high off the ground.

Many lamp clamps are known in the art. Some of the commonly used ones are described herein. A Cheeseborough clamp (U.S. terminology) or Scaff clamp (U.K. terminology) is shown in FIG. 1. The clamp 100 is shown in its open position in FIG. 1. The moving part 122 of the clamp pivots around pivot point 104 to form a closed clamp as shown in FIG. 2 which closes around the supporting pole or pipe. The clamp can be tightened by tightening bolt 106 relative to bolt accepting mechanism 108, which can be a slot or the like in a plate. The appropriate tightening reduces the size of the inner surfaces, to tighten the clamp and to maintain the lamp in position relative to pole 200.

The inventors of the present invention recognized that this system is very difficult for the installers to use. One main reason is because the entire weight of the lamp must be supported by the installer while attaching the lamp to the pole 200. FIGS. 1 and 2 show these clamps in the open and closed position, respectively to demonstrate the installation. In order to install the lamp, the installer must hold lamp 110 while placing the open clamp 100 against pole 200 and while holding surface 120 of the open clamp against the supporting pole 200. The clamp is hinged around pivot 104 to form a cylindrical inner area 205, as shown in FIG. 2. Bolt 106 holds relative to bolt accepting element 108.

In order for the lamp to be properly attached to the supporting pole 200, therefore, the bolt 106 must be screwed into the accepting element 108 (e.g., a nut or a split holder). Alternately, a wing nut or like mechanism, on element 108 can be screwed into bolt 106. In any of those cases, the installer must hold the weight of the lamp, which can be as heavy as 60 pounds, while holding the clamp closed and simultaneously screwing the nut into place. Moreover, even once the nut is screwed into place, the lamp is still not maintained in its proper position relative to the pole until the nut and screw 106, 108 are properly tightened.

These most-common kind of lamp clamps have been recognized by the inventors of the present invention to cause problems, making the lamps very difficult to install.

A second kind of mounting mechanism is shown in FIG. 3. The lamp 110 is connected to a folded piece of metal 300, which includes vertically extending portions 302 and 304, and a horizontal portion 306. The inside surface 308 of clamp 300 is placed against the supporting pipe 200. Since the metal 300 is formed of folded flattened metal sheets, the inside surface 308 touches the pole 200 only at tangent points between the flat surfaces and the round pipe, such as 310. Rotation of lamp 110 relative to pole 200 is prevented by tightening set screw 312 against point of contact 314 on the pole 200.

There are still problems with this system. Significantly, this system allows the weight of the lamp to be placed on the pole prior to tightening the set screw 312. However, the lamp can still rotate relative to the pole, at least until the set screw is tightened against the pole. Moreover, this design tends to distort the roundness of the pole because of the large amount of force at the location 314 where the set screw 312 touches the pole. As can easily be seen, moreover, the system is inherently unbalanced.

A different, but similar kind of prior art clamp is shown in FIG. 3A. That clamp includes the same basic structure as shown in FIG. 3. It includes the set screw 312 which presses against a portion of the support pole 200. Ridges 350 and 352 provide extra friction to hold the lamp relative to the pole.

Power must also be applied to the lamp. Typically the power travels either along the pole or along a separate conduit, which is near the pole. The inventors of the present invention have recognized the inconveniences and difficulties, which often occur in getting the power to the lamp.

Since the lamps are very heavy, it is also important to ensure that the lamp does not fall from its position on the pole. Accidents can happen, for example, if a technician fails to properly secure the lamp to the pole, or if the securing mechanism fails. Such accidents risk both damage to very expensive equipment, as well as a serious threat to stage workers. One aspect of the present invention proposed a fail-safe mechanism for a lamp.

It is also desirable that the lamp mounting mechanism be versatile in its selection of mounting techniques. One particularly interesting mounting technique is a floor mounting. This technique uses a plate or other support base holding special flanges on the clamp. Those flanges position the lamp and clamp "upside down" relative to the position in which the lamp would be if pole mounted.

It is an object of the present invention to provide a clamp which allows flexibility and safety by special techniques which can be used individually or in combination. This is done according to the present invention by providing an element, which has interior surfaces defining an area which approximates in shape the outer surface of the supporting truss, over at least over half of the outer surface of the truss support. This ensures maximal frictional contact between the support and the clamp. This friction maintains the lamp in its proper position relative to the truss, even prior to frictional tightening.

A movable element tightens a tightening device into contact with the support element to further maintain the lamp in position. The inventor recognized that the combination of an inner surface approximating the outer surface of the support pole, and a design that allows hooking over the support pole produces a much easier-to-use system.

Structure is provided in the clamp that facilitates the channelling of power to the lamp. One aspect of this invention includes a special structure incorporated within the clamp which facilitates power routing to the lamp. This structure includes surfaces defining a special hole in a special location on the clamp. A special connector receives power and routes the power to a power conduit. That power conduit is routed around the rear of the connector through another hole and into the lamp. This aspect facilitates application of power to the lamp without the need to provide a separate external power conduit.

Another feature of the present invention uses a fail-safe mechanism, which allows a safety cable through the clamp and around the pole. A technician mounting the lamp can initially connect the safety cable to avoid the lamp falling or the like while it is being installed.

Another feature of the present clamp provides two separate mounting surfaces: a first surface which allows connection to a support pole such that the clamp is secured in a first orientation, and a second surface which allows connection in a way such that the clamp is secured in a second orientation, different than the first orientation. The preferred surfaces include pole mounting surface, mounting the lamp on the bottom of the clamp, and a floor mounting surface mounting the lamp on the top of the clamp.

BRIEF DESCRIPTION OF THE DRAWINGS

These and other aspects of the invention will now be described in detail with reference to the accompanying drawings, wherein.

DESCRIPTION OF THE EMBODIMENTS

Figure 4:
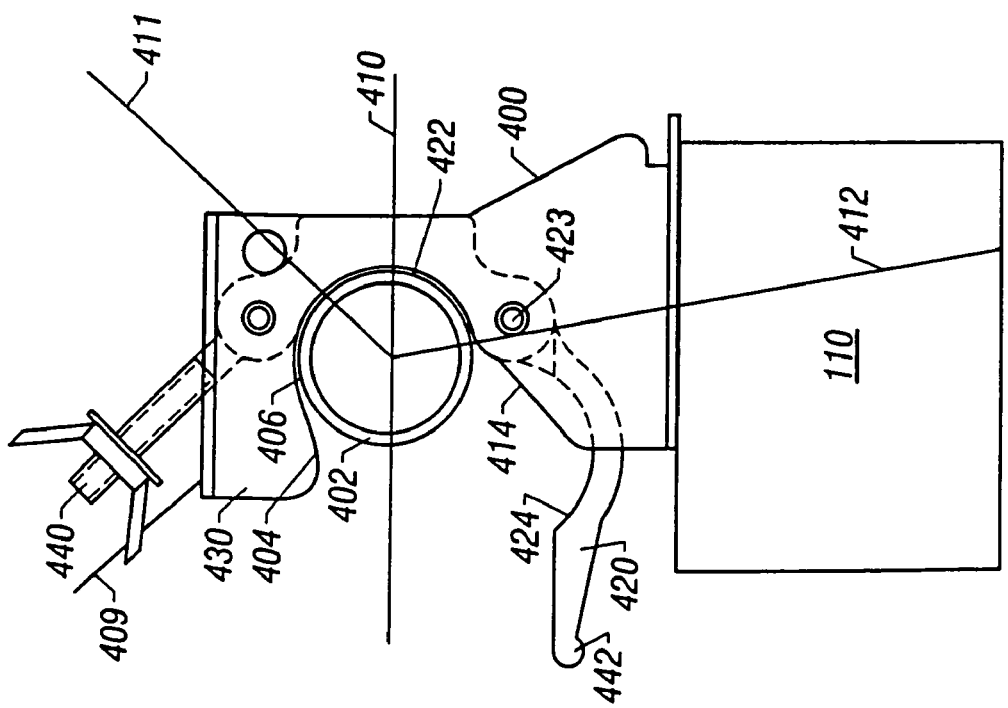
FIG. 4 shows a side view of the clamp of the present invention in the open position.

FIG. 4 shows a first embodiment of the invention, which includes lamp 110 connected to the hook clamp 400 of the present embodiment. More generally, any load could be attached to hook clamp 400. Hook clamp 400 is adapted to surround a substantially cylindrical support 402 to hold the weight of lamp 110. Support 402 is conventionally a pole, although it could be of any shape.

The hook clamp includes inner surfaces 404 which are substantially the same size and shape as the outer surface 406 of the support 402. By this is meant that the inner surfaces are sized and shaped similarly to the support. The shapes are sufficiently similar that there is a maximal amount of friction between the clamp and support to keep the clamp in position even prior to tightening. This embodiment attaches to a cylindrical support element 402, and surfaces 404 at least along a portion of the clamp are similarly cylindrical. The line 410 indicates a dividing line. Inner surfaces 404 above the dividing line 410 are cylindrical in shape and of substantially similar shape to the outer surface 406 of the support. The portions between lines 411 and 412 are also cylindrical. The pressure of outer surface 406 of pole 402 against inner surface 428 of hook portion 430 presses cylinder 402 into cylindrical surface area 422—at least between lines 411 and 412, and more preferably between lines 409 and 412. The surface 414 preferably includes relatively flat surfaces against which the pole is pressed during the initial time while the hook portion 430 is being secured into position over the pole 402.

Figure 1:
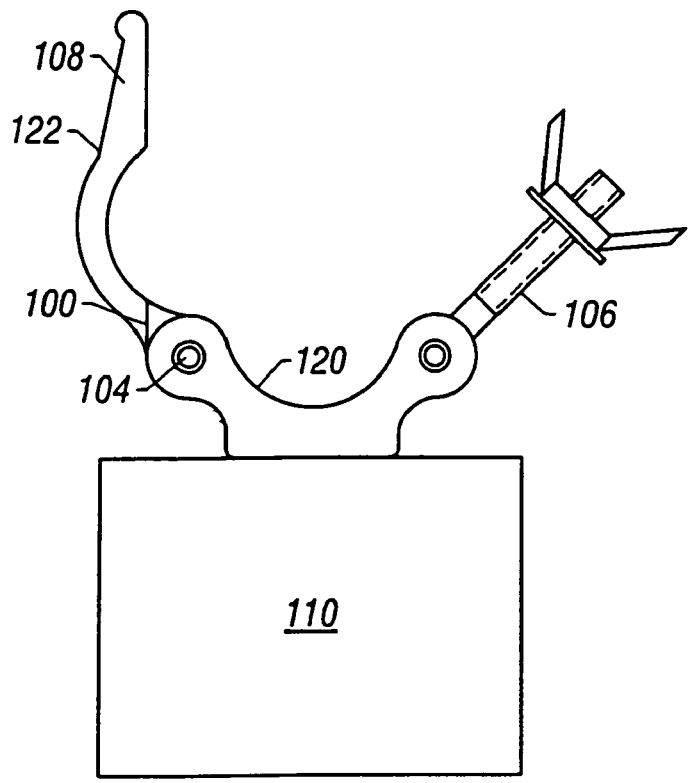
FIG. 1 shows a Cheeseborough clamp of the prior art in the open position.
Figure 2:
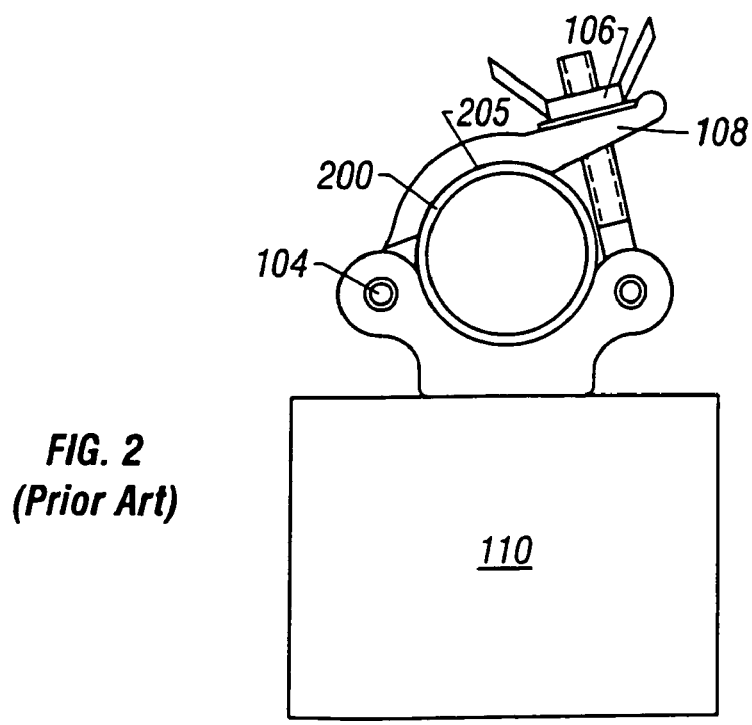
FIG. 2 shows the Cheeseborough clamp in the closed position.
Figure 3:
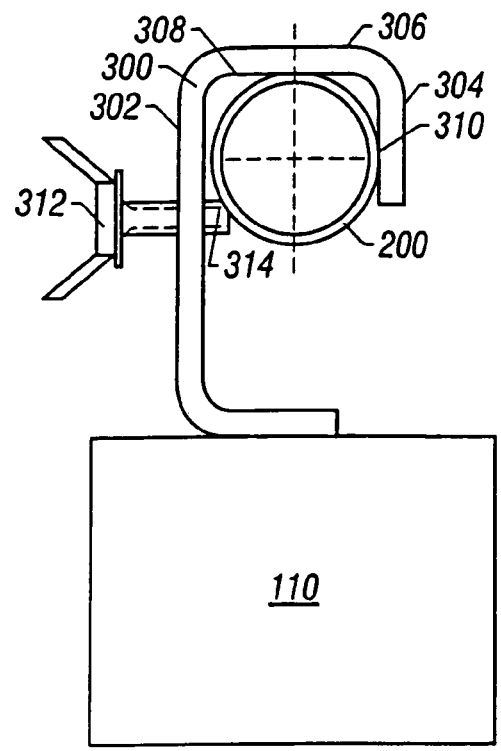
FIG. 3 shows another clamp of the prior art.
Figure 3A:
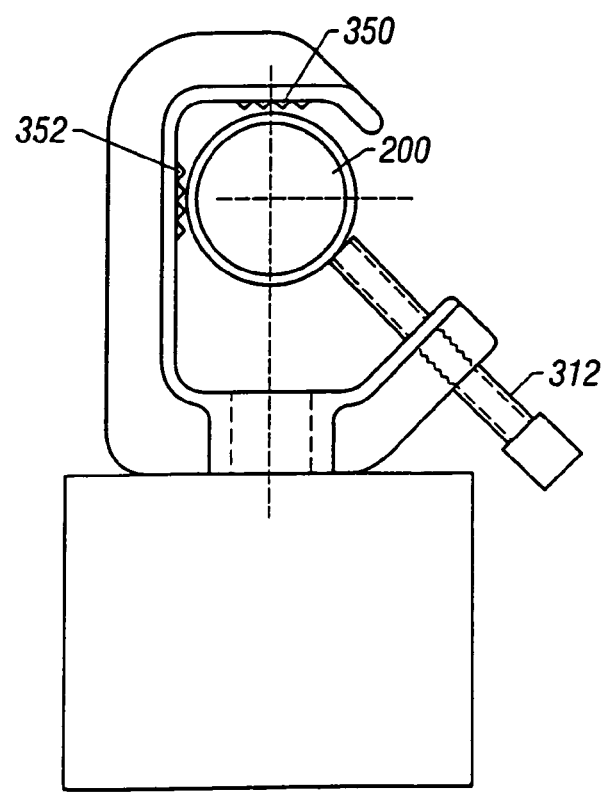
FIG. 3A shows a modification of the FIG. 3 clamp.
Figure 5:
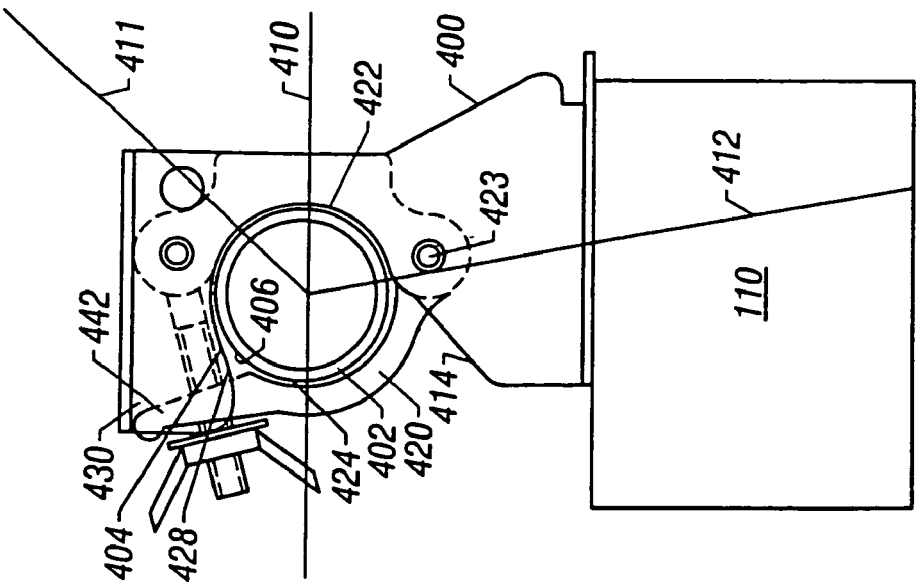
FIG. 5 shows the clamp of the present invention in the closed position.

The tongue 420 pivots around its pivot point 423, and can be moved into a position where the inside surface 424 fictionally engages against the support member 402. This final position is shown in FIG. 5, with the surface 424 abutting against the outer surface of the support 402. The other surfaces 406 of the support which are above the line 410 also abut against the inner surfaces 404 of the internal cylindrical element. Inner surface 424 of the tongue is preferably concave and similar in shape to the outer surface of support 402.

In operation, the user "opens" the tongue 420 by lowering it to its lowermost position shown in FIG. 4. The user first hooks the device over the support member 402. The support member 402 comes in contact with surface 414. The clamp can slide with the flat surface 414 against the pole. The clamp slides until the hooked end 430 is located above and hooked over the top support surface 406. At that time, the outer surfaces 406 of support 402 contact inner surfaces 404 of the clamp 400. The lamp 110 is preferably located at the center of gravity of the clamp, to minimize side-to-side torque on the clamp. The friction of the close fit between the inner surfaces of the clamp and the outer surfaces of the support pole therefore are preferably sufficient to keep the lamp steady and in position.

The tongue 420 is then lifted into position, placing the bolt 440 into a corresponding notch 442 to close the clamp as shown in FIG. 5. Notch 442 can be formed in hooked end portion 430 or in tongue 420. When the bolt is tightened, it holds the inside surface 424 into close frictional contact with the support 406. This tightens the clamp around the pole, so that the support is fictionally held by many similar-shaped surfaces. Since many surfaces of the pole are held, less tightening is necessary and hence there is less chance of distorting the pole shape. Preferably, many of the parts of the clamp are of similar shape to the outer surface of the pole. All portions above the line 410 are of similar shape, and preferably this is approximately 140° of the circle defined by the cylinder. Preferably all portions between the lines 411 and 412 also define arcs which are circular and which hence closely approximate the shape of the pole. The position from the left part of line 410 to the right part of line 412 preferably defines about 250° of the circle. An additional 30° or so also has similar shaped elements in the surface 424. Accordingly, preferably 280° of the circle defined by the cylinder are substantially the same shape as the surface of the pole. This means that only 80° is not the same shape as the support pole.

Thus 280/360, or approximately 75 percent, of the outer surface of the pole is preferably gripped by similar-shaped surfaces of the clamp.

The above-described first embodiment has the significant advantage of allowing frictional holding of the lamp even prior to tightening. This frictional holding, combined with the advantageous structure of the lamp hook of the present invention keeps the lamp hooked in place on the support pole.

A second embodiment of the present invention includes additional structure.

Figure 6:
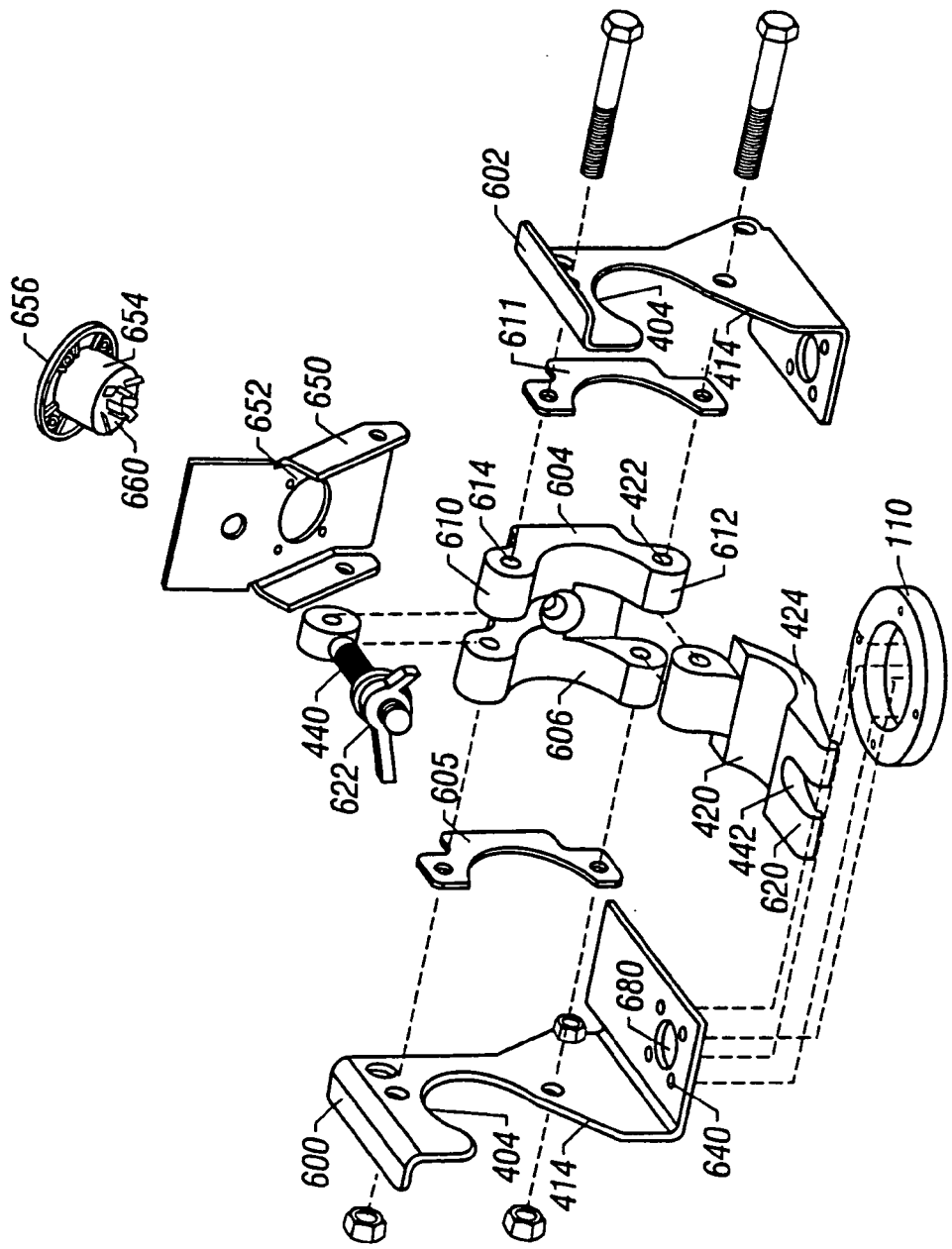
FIG. 6 shows an exploded view of the clamp of the present invention.
Figure 7:
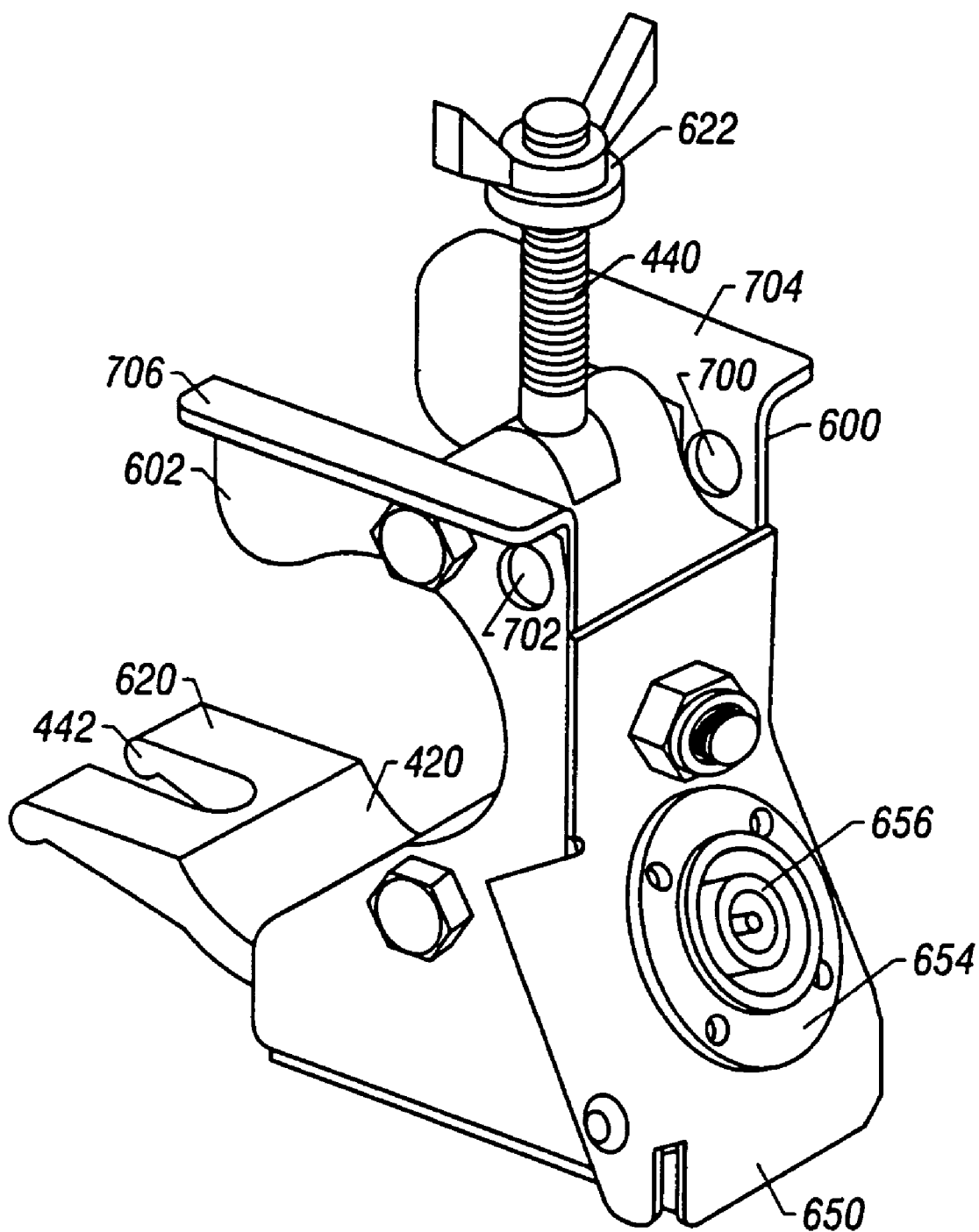
FIG. 7 shows an assembled view of the clamp of the present invention.

FIG. 6 shows an exploded view of the multiple parts making up the hook clamp of the second embodiment. It should be understood that these parts making up the exploded view are also the same parts, which exist in the first embodiment. FIG. 7 shows the hook clamp fully assembled.

The hook clamp body is formed of two bent elements of sheet metal, including left member 600 and right member 602. Each has a cutout area defining a cylindrical surface 404 and defining flat surface 414. Members 600 and 602 are bolted to one another through a rear surface element 604. Element 604 has inner surfaces 606 defining substantially a portion of a cylinder. The hook clamp is bolted together to form an element having left 600 and right pieces 602, separated by the width of spacers 605, 611. Spacer elements 605 and 611 are provided between the central element 606 and the respective end elements 602 in order to prevent the tongue 420 and bolt 440 from pinching between the sheet metal elements 600, 602.

The rear surface element 604 also includes top and bottom split portions 610 and 612. Each of the split portions includes a movable element therein which is pivoted about a pivot point. The "top" split element 610 includes inner surfaces allowing bolt 440 to pivot therein. Bolt 440 pivots about pivot axis 614 to be swung up and out of the way for attachment of the lamp. Bolt 440 is later pivoted into position for securing the tongue. Lower split portion 612 includes inner surfaces allowing tongue 420 to pivot relative thereto along the tongue axis 422.

Tongue 420 also includes split portion 442 having surfaces 620 which are pressed against by corresponding surfaces 622 of the bolt. When the bolt 440 is tightened, the surfaces 622 press against the surfaces 620 to press tongue surfaces 424 closer to the rear surfaces 606. This has the effect of reducing the internal surfaces defining the cylindrical grip of the clamp, to thereby press the hook clamp more tightly against the cylindrical support 402.

The left and right pieces 600 and 602 include mounting holes 640 therein, preferably at a center of gravity of the clamp device. Mounting holes 640 receive screws for mounting the lamp 110.

The inventors of the present invention further recognized that electrical connection to the lamp could be facilitated by providing a connector, which is a integral part of the lamp. This connector portion operates as shown and explained herein.

The rear mounting plate 650 includes special inner surfaces 652 defining a hole of the proper size to receive a speak-on type connector 654. This connector is well known in the art, and is of the type typically used in the lighting industry. Of course, any suitable connector could be located in this position. The interface end 656 of the speak-on connector receives the power cable to provide power and/or control signals. FIG. 7 shows the exit end 660 providing an output to interface cable 670. A wiring end 672 of interface cable 670 has its wire elements respectively connected to the connector terminals 662 of the connector 654. The interface cable 670 runs along the rear surface of the rear surface element 604, and into the inner surface hole of sliding connector 680.

Figure 8:
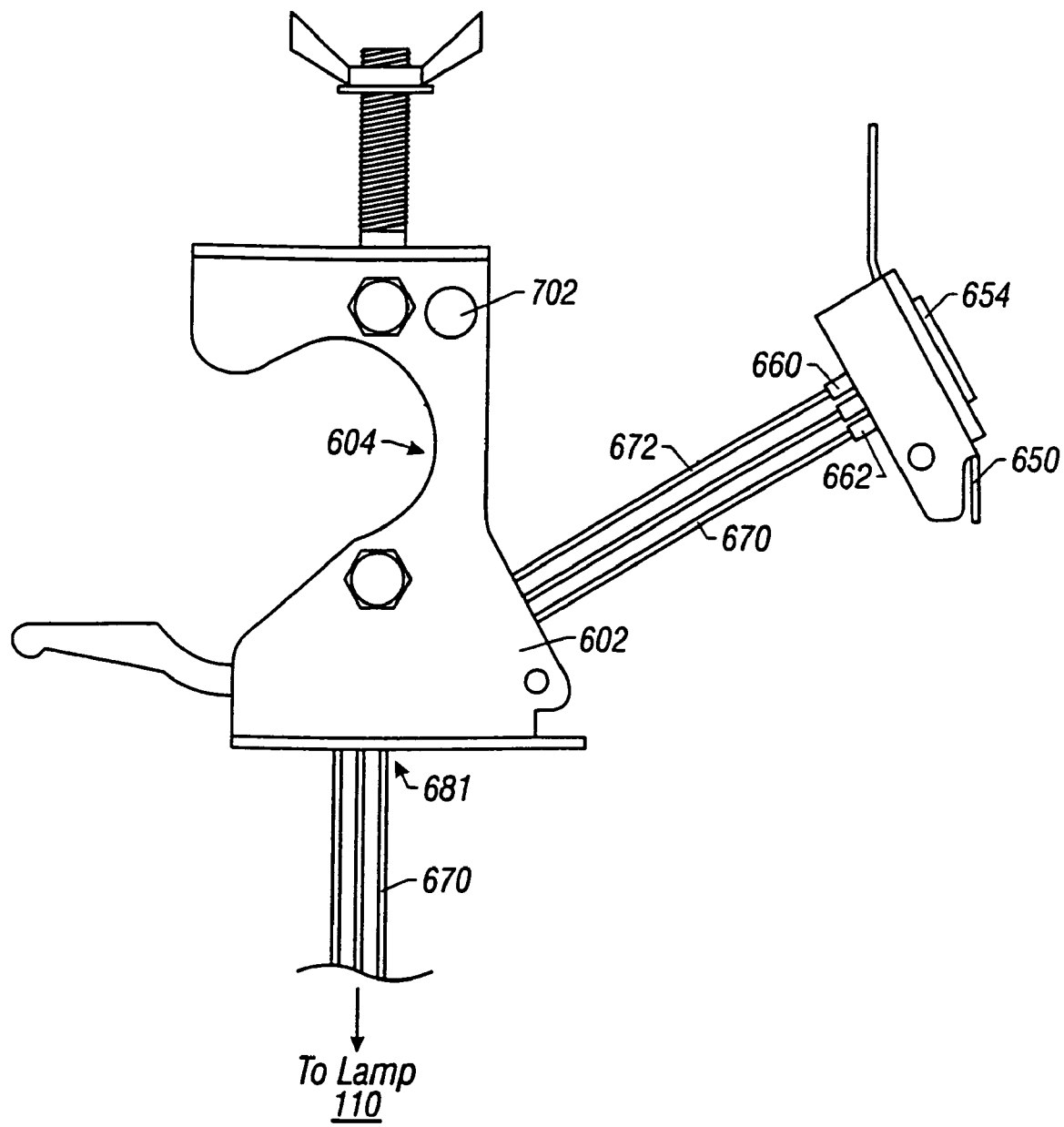
FIG. 8 shows a side view of the clamp and interface cable of the present invention.

FIGS. 7 and 8 show two fail-safe holes 700 and 702 provided in left and right pieces 600 and 602 respectively. A sturdy safety cable can be threaded through fail-safe holes 700 and 702 and around the cylindrical support 402 (or through some fixture attached to the lamp pole), to secure the hook clamp 400 to the cylindrical support 402, even if its tongue 420 is not yet secured against support 402. This allows a technician installing the lamp to secure the hook clamp and lamp assembly to the pole with a safety cable through at least one of the holes and around the supporting pole 402. The cable can remain securing the lamp and hook clamp, even in the event of any failure of the hook clamp mechanism.

Figure 9B:
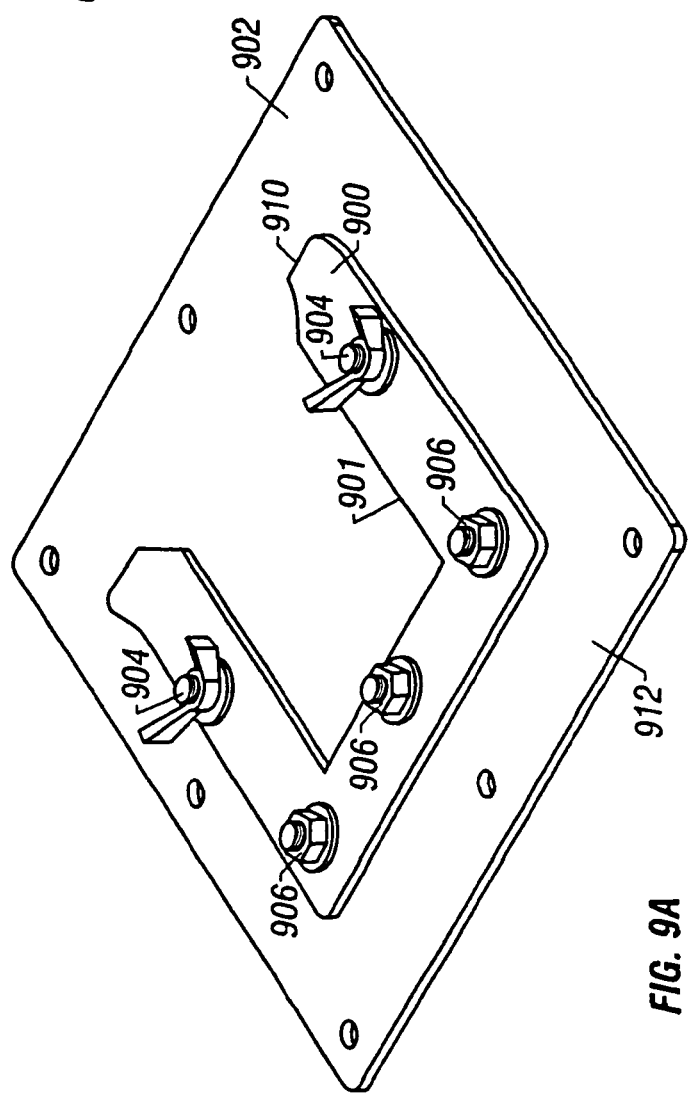
FIGS. 9A and 9B show an elevated view of the clamp and mounting bracket of the present invention.
Figure 9A:
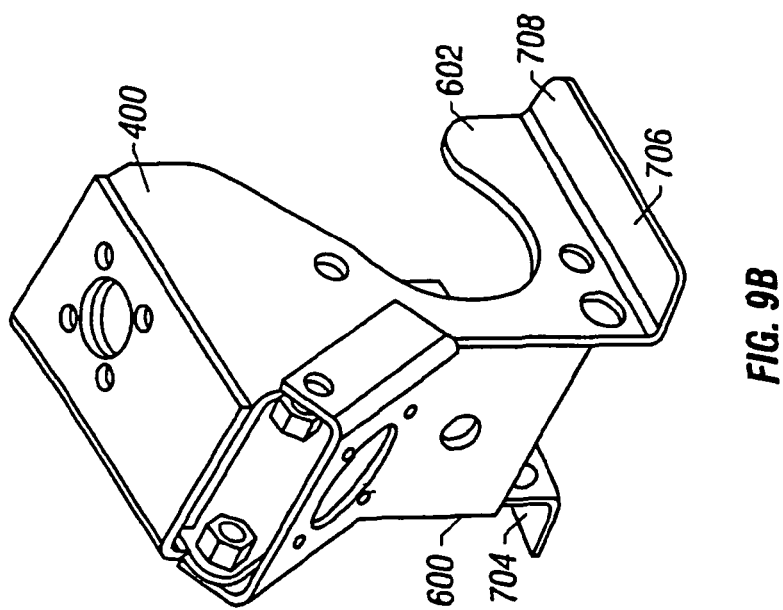
Figure 10:
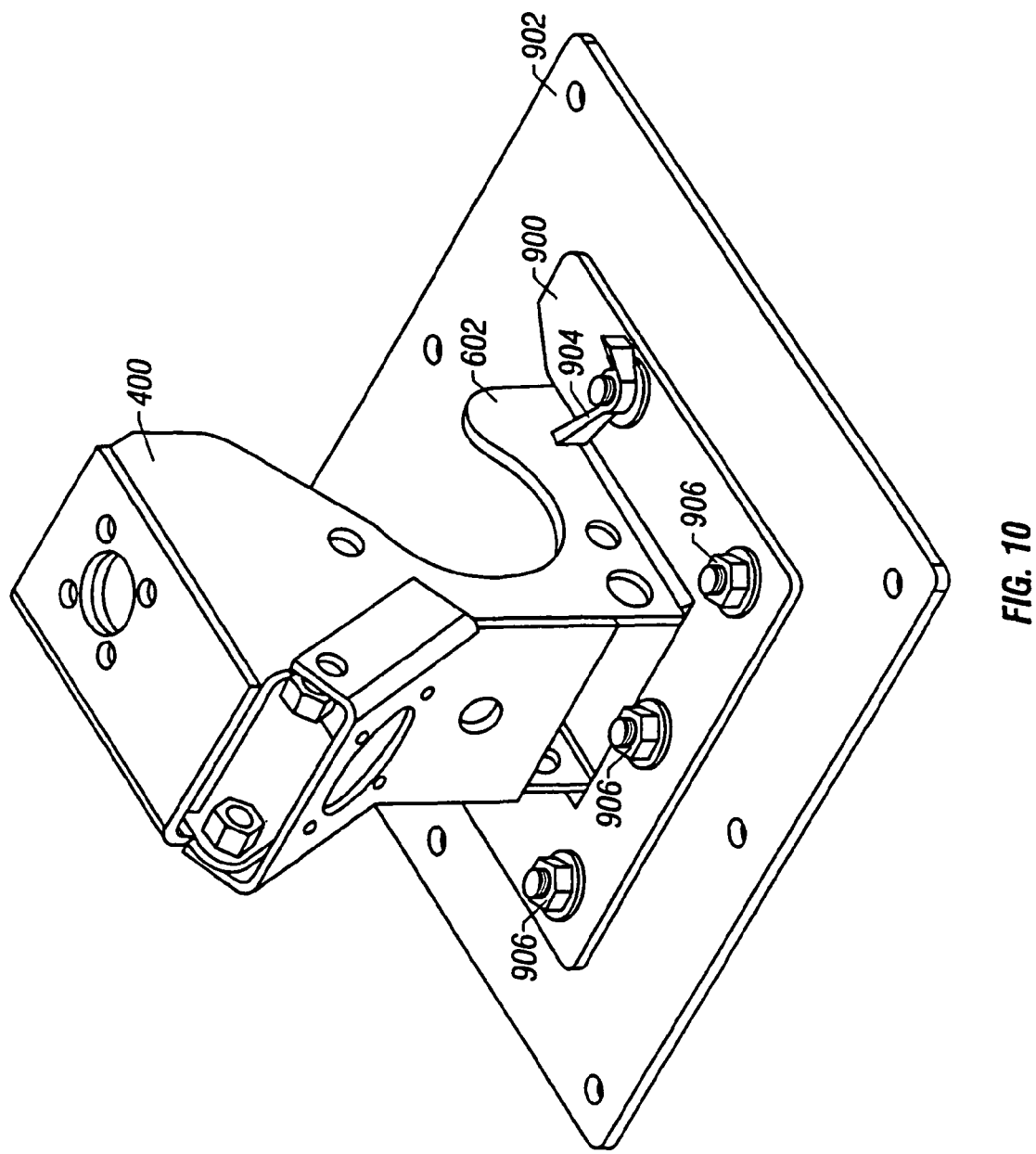
FIG. 10 shows an elevated view of the clamp and mounting bracket of the present invention mated together.

A particularly preferred and alternative embodiment of the invention enables an alternative mounting mechanism for the hook clamp. The left and right pieces of the hook clamp 602 are formed with special mounting flanges shown as 702, 704. The otherwise planar end pieces 602, 604, have mounting flanges, which extend in a perpendicular direction to the plane formed by the left and right pieces. Those mounted flanges can be used for an alternative mounting system which is shown in FIGS. 9A, 9B and 10. The hook clamp is shown in FIG. 9A, mounted in an upside down position as compared with the position of pole mounting. In this position, the flange surfaces 704, 706 hold the hook clamp in place, as compared with the normal position in which the inside surfaces 404, etc. hold the hook clamp in place. The flange 704, 706 have respective outer surfaces 708 which are held by a clamping mechanism 900. The clamping mechanism 900 includes clamping surfaces 901 which respectively clamp against the clamped surfaces 706 of the hook clamp.

Clamping plate 902 includes a plurality of tightenable bolts 904, and a plurality of fixed bolts 906. When bolts 904 are loosened, the clamp 904 pivots relative to the fixed bolts 906. The clamping surface of clamp 900 at end 910 can be lifted up slightly from the underlying support 912. The end 910 preferably includes an upwardly extending flange, which slips over the clamping surfaces 708. This facilitates locating the surfaces 708 into their proper location. The entire clamping surface 901 of the clamp can be lifted slightly from the underlying surface 912. Once the clamping surfaces 708 are located into their proper position, the tightenable bolts 904 are tightened to thereby tightly press the tightening surfaces 901 against the corresponding tightening surfaces 708. The clamp in place is shown in FIG. 10. Note that the clamp surfaces hold the supporting pole in the same way as in the other manner of tightening. Moreover, the tongue portions are omitted from the FIGS. 9A, 9B and 10 figures, however, it should be understood that these tongue portions would preferably hold the lamp into place.

An important feature of this alternative embodiment is its ability to allow the lamp to be mounted into two different mounting locations using the same mounting structure.

Figure 11:
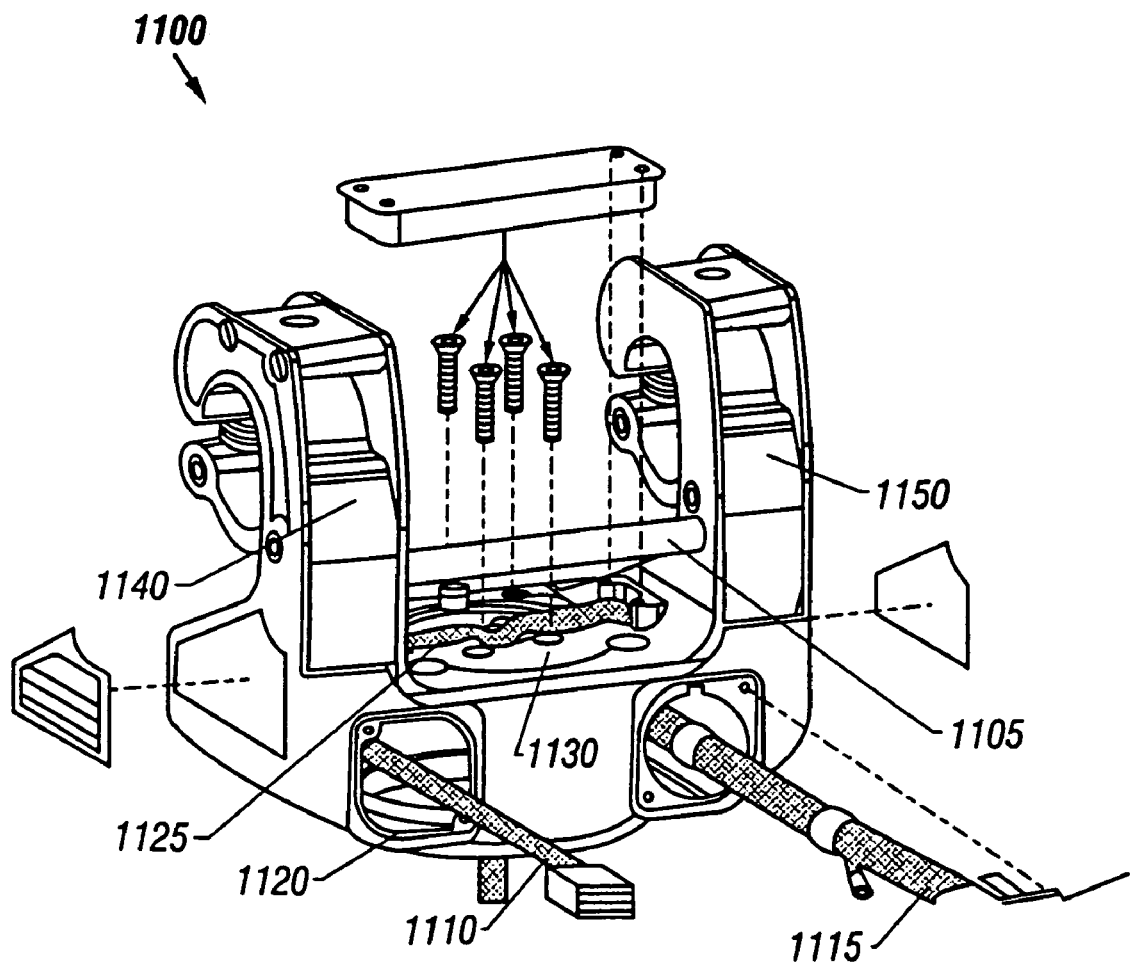
FIG. 11 shows a dual clamp embodiment.

A dual hook clamp embodiment is shown in FIG. 11. This embodiment shows a dual hook clamp assembly 1100, with a special carrying handle 1105. The clamp assembly can also be rotated in special ways.

FIG. 11 shows an electrical connection. Cables 1110 and 1115 are the main cables in the lamp which receive power, data, and diagnostics, and are routed through the hook clamp assembly 1100, through central aperture 1130, and down into the main lamp assembly. The rear housing part 1120 has connector mounting apertures for mounting connectors which are permanently attached to cables 1110 and 1115. External cables with appropriate mating connectors can the be plugged into the permanently mounted connectors in the hook clamp, thereby providing easily removable power, data and diagnostics connections to the lamp.

The clamp assembly includes two hook clamps 1140 and 1150, each of which has the configuration described above. Specifically, each has inner surfaces defining a cylinder, and a tightenable tongue.

Figure 12:
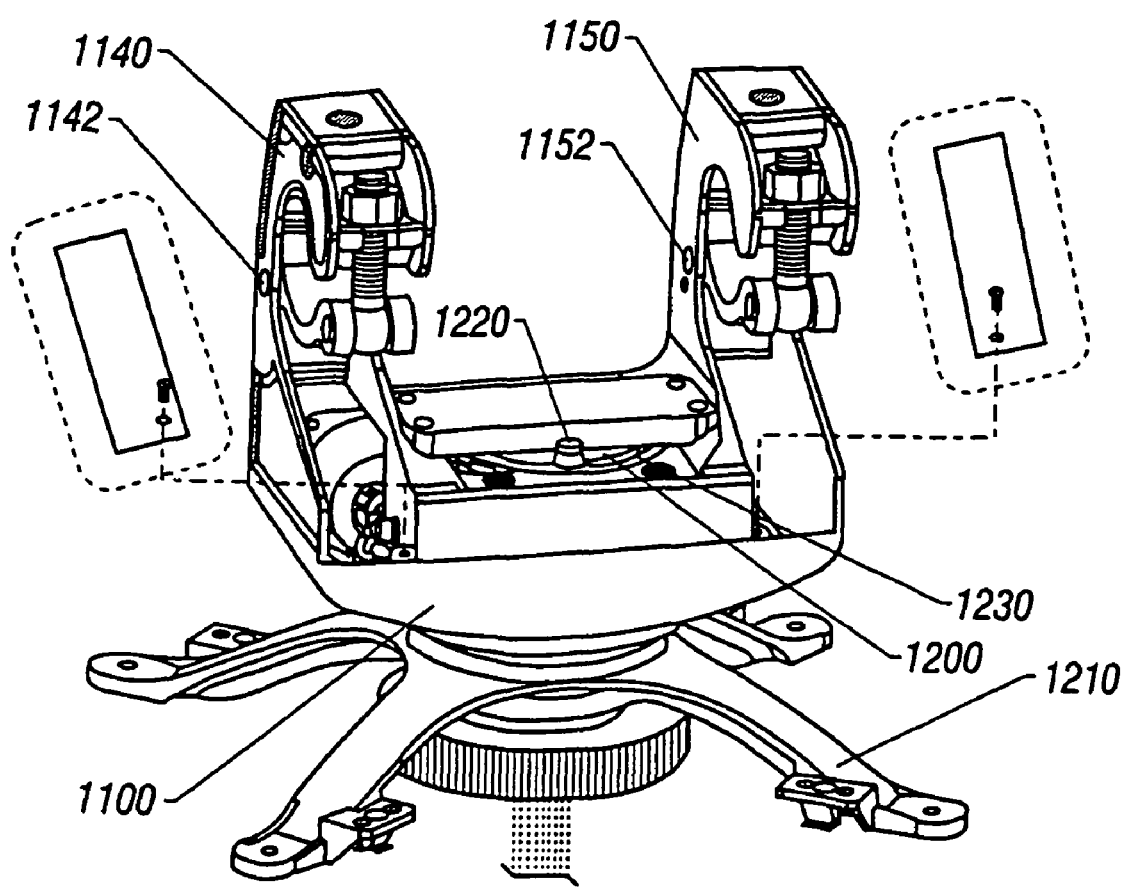
FIG. 12 shows a reverse view of the dual clamp embodiment.
Figure 13:
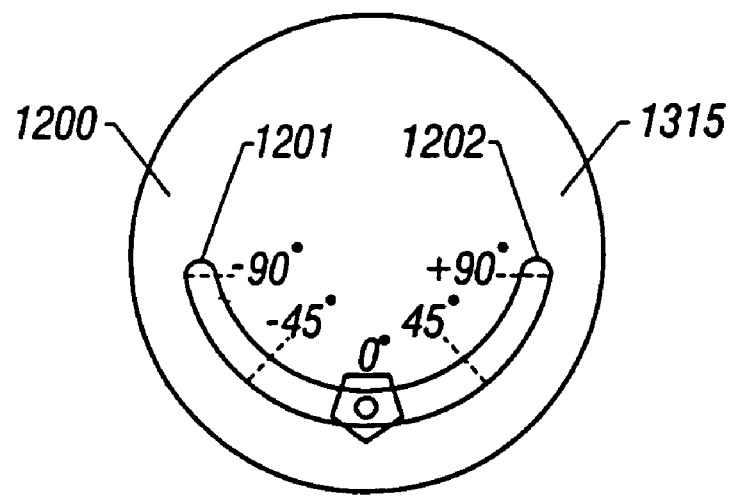
FIG. 13 shows the calibration plate.

FIG. 12 shows an arrangement of the hook clamp and shows how the device is rotatable. A rotation plate 1200, shown in more detail in FIG. 13, allows setting initial orientation relative to other lamps and thereafter controlling all lamps in a group as though they were the same.

Figure 14:
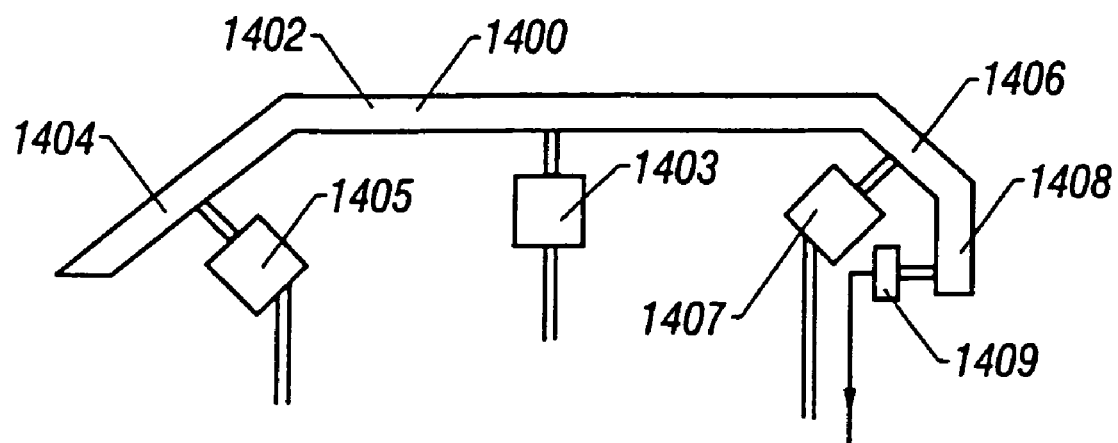
FIG. 14 shows a layout of multiple luminaries.

Lamps may be oriented in different directions when set up. For example, FIG. 14 shows a truss 1400 that has a number of different parts with different orientations relative to one another. Section 1402 makes a 450 angle with section 1404. Hence, the lamp 1403 is set at a different angle than the lamp 1405. Similarly, truss sections 1406 and 1408 hold lamps 1407 and 1409 that have different angles of orientation relative to one another. However, in this embodiment, they may all need to be pointed in the same, or a similar direction to one another when in their "zero" (reset) positions. This orientation allows all the lamps to have the same range of controlled movement relative to the stage/studio area during operation.

An initial orientation of the lamp can be set using the rotation plate 1200. Support bracket 1210 provides structural support for the lamp. Bearings contained within the support bracket 1210 allow the bracket to rotate freely relative to the hook clamp assembly 1100, thereby allowing free rotation of the lamp. However, mechanical end stops e.g. 1201, 1202 contained within the whole assembly restrict the rotation of the support bracket relative to the hook clamp assembly within a specified range. This is because cables pass through the center axis of the assembly and these cables have a limited range of "twist", so the range of rotation needs to be mechanically restricted.

In this particular embodiment, the "zero" position of the lamp is determined as the midway position between the two end stops, i.e. half way through the range of rotation, although it could equally be set at one or other end of the rotation range, or any position within the range. Essentially, the "zero" position is a position known to the drive electronics relative to the mechanical limit of rotation.

FIG. 12 shows a hook clamp assembly 1100 and a support bracket 1210. As previously described, the support bracket 1210, which holds the lamp, is freely rotatable relative to the hook clamp 1100 within the limits of the end stops contained within the assembly. Rotation plate 1200 is held captive within the hook clamp assembly but is able to rotate if nut 1220 is loosened. Nut 1220 is threaded onto a bolt which is fixed into the hook clamp and passes through a radial slot 1230 in the Rotation Plate 1200. The nut has a bottom surface that, when the nut is tightened, presses against the plate surface 1315 and locks the rotation plate in position. The rotation plate 1200 is directly attached to the mechanical end stops within the assembly via a central shaft, and the rotational relationship between the rotation plate and the end stops is permanently fixed. The slot 1230 allows the rotation plate 1200 to be rotated relative to the hook clamp 1100 whenever the nut 1220 is loosened. Because the rotation plate is directly and permanently attached to the end stops, rotating the rotation plate alters the position of the end sops relative to the hook clamp 1100 and thereby adjusts the "zero" position of the lamp relative to the hook clamp. In this way, the lamp can be adjusted into any rotational orientation relative to the other lamps on the truss irrespective of the orientation of the hook clamp.

When the nut is loose, lamp holding part can rotate relative to clamp body 1100. This rotation changes the orientation of the lamp relative to the body. The rotation is shown in FIG. 13B, which shows how the pan shaft can rotate relative to the body.

In operation, all lamps in a group, i.e., those that need to be controlled together, are oriented so that their base position, their "zero" position, is the same. Using the FIG. 14 example, lamp 1405 is mounted with the plate set at −45 degrees, 1403 at zero degrees, 1407 at +45 degrees, and 1409 at 90 degrees. When the plates are mounted in this way, each of the lamps has a reset position, which is in the same direction. Therefore, they can be controlled as though they were all mounted, oriented, and facing in the same direction.

The carrying handle 1105 is installed between the two hooks 1140 and 1150, mounted into corresponding holes 1142, 1152 in each one. The handle is mounted at a specified location, below and behind any location that might cause it to clash with the structure of the truss, either during hanging, or when hung, and thereby not reducing the number of installation possibilities, or restricting the operation of installing the lamp, compared to if there were no handle present.

Once the lamp is hung and secured, it can be rotated to a desired orientation using the rotation plate 1200 and the nut 1200 tightened to secure the plate and thereby set the "zero" position of the lamp.

This can facilitate installation, since the same lighting effect can be obtained by installing on any truss facing in any desired direction.

Although only a few embodiments have been described in detail above, those having ordinary skill in the art will certainly understand that many modifications are possible in the preferred embodiment without departing from the teachings thereof.

All such modifications are intended to be encompassed within the following claims.

What is claimed is:

1. A method, comprising:
   mounting a plurality of truss mounted lamps by attaching each of said truss mounted lamps of the plurality of lamps to supporting trusses, wherein at least one of said supporting trusses extends in a different direction than another of said supporting trusses, wherein said truss mounted lamps are formed on a bracket which includes a truss mounted portion and lamp mounted portion;
   using a graduated scale on each of a plurality of lamps to adjust a base position of each lamp, wherein said using comprises moving a truss mounted portion of the bracket relative to said lamp-mounted portion;
   said graduated scale configured for allowing each of the plurality of lamps to point in the same direction,
   wherein said using comprises using said graduated scale when said each of the plurality of lamps points in the same direction to have at least one value on one graduated scale of one of the lamps being different than a value on a graduated scale than another one of the lamps by an amount set on said graduated scale, whereby said graduated scales are arranged such that said mounting and said using controls all the lamps in the plurality of lamps to point in a common direction; and
   receiving an electronic control signal which controls the plurality of lamps to move commonly as though each lamp was mounted on trusses extending in the same direction.

2. A method as in claim 1, further comprising securing said truss mounting portion relative to said lamp mounting portion after adjusting the lamp.

3. A method, comprising:

attaching a plurality of lamps to a plurality of trusses wherein at least one of said trusses extends in a different direction than another of said trusses, wherein said lamps are formed on a bracket which includes a truss mounted portion and a lamp mounted portion;

loosening a connection between a connection to a truss and a connection to the lamp;

adjusting an angle between the connection to the truss and the connection to the lamp for at least some of the plurality of lamps, by moving a truss mounted portion of the bracket relative to said lamp-mounted portion, said adjusting causing a group of said lamps to point in the same direction even though at least one of the trusses holding said group of lamps extend in different directions than another of the trusses holding said group of lamps; and subsequently tightening the connection between the connection to the truss and the connection to the lamp; and receiving an electronic control signal which controls different lamps in the plurality of lamps to move commonly based as though each of the plurality of lamps was mounted oriented on a truss that extended in the same direction.

4. A method as in claim 3, wherein said adjusting comprises adjusting each of the plurality of lamps to point in the same direction their basic state.

5. A method as in claim 3, further comprising controlling the plurality of lamps as a group which are all controlled to point in the same direction.

6. A method as in claim 3, further comprising, prior to said attaching, maintaining the lamps in a reset position.

7. A method as in claim 3, further comprising limiting an amount of adjustment in said adjusting to an amount which prevents cables from being overtwisted.

* * * * *